US010145552B2

(12) United States Patent
Fay

(10) Patent No.: US 10,145,552 B2
(45) Date of Patent: Dec. 4, 2018

(54) MAGNETIC LIGHT EMITTING DIODE (LED) LIGHTING SYSTEM

(71) Applicant: Jonathan Eric Fay, Keizer, OR (US)

(72) Inventor: Jonathan Eric Fay, Keizer, OR (US)

(73) Assignee: Lux Lighting Systems, LLC, Keizer, OR (US)

(*) Notice: Subject to any disclaimer, the term of this patent is extended or adjusted under 35 U.S.C. 154(b) by 0 days.

(21) Appl. No.: 15/083,265

(22) Filed: Mar. 28, 2016

(65) Prior Publication Data
US 2016/0281973 A1   Sep. 29, 2016

Related U.S. Application Data

(60) Provisional application No. 62/138,766, filed on Mar. 26, 2015.

(51) Int. Cl.
| | |
|---|---|
| *B60Q 1/26* | (2006.01) |
| *F21S 43/14* | (2018.01) |
| *F21S 43/19* | (2018.01) |
| *F21S 45/47* | (2018.01) |
| *F21V 19/00* | (2006.01) |
| *F21V 29/70* | (2015.01) |

(Continued)

(52) U.S. Cl.
CPC ............ *F21V 29/70* (2015.01); *B60Q 1/2615* (2013.01); *B60Q 1/2696* (2013.01); *F21S 43/14* (2018.01); *F21S 43/19* (2018.01); *F21V 19/002* (2013.01); *F21V 21/096* (2013.01); *F21S 45/47* (2018.01); *F21Y 2103/10* (2016.08); *F21Y 2115/10* (2016.08)

(58) Field of Classification Search
CPC combination set(s) only.
See application file for complete search history.

(56) References Cited

U.S. PATENT DOCUMENTS 5,107,408 A * 4/1992 Vernondier ........... E04F 19/061
                                                                    362/219
5,661,374 A * 8/1997 Cassidy ................. G05F 1/577
                                                                    315/185 R (Continued)

FOREIGN PATENT DOCUMENTS

EP       2080947 A1      7/2009

OTHER PUBLICATIONS

Electrical Engineering https://electronics.stackexchange.com/questions/190980/t1c5940nt-12v-5050-led-strip . FIG and text showing resistors on strip, Sep. 17, 2015.*

(Continued)

*Primary Examiner* — Daniel I Walsh
(74) *Attorney, Agent, or Firm* — Baker & Hostetler LLP

(57) ABSTRACT

The present disclosure describes example magnetic LED lighting systems. A lighting apparatus in accordance with the present disclosure may include LEDs connected in series with a resistor. The LEDs are each coupled, directly or via thermal vias through a mounting element, to one or more magnets. The magnets may serve dual purposes: as a heat sink to dissipate heat and enable LEDs to be used, and as a mounting device to mount the lighting apparatus to a desirable location, such as on an automobile or an industrial machine. The dual-purpose magnets may eliminate the need for an additional heat sink element, thereby reducing weight and/or size of the lighting apparatus.

19 Claims, 11 Drawing Sheets

(51) Int. Cl.
*F21V 21/096* (2006.01)
*F21Y 103/10* (2016.01)
*F21Y 115/10* (2016.01)

(56) References Cited

U.S. PATENT DOCUMENTS

| | | | |
|---|---|---|---|
| 5,803,577 A * | 9/1998 | Stratton | B60Q 1/2615 362/223 |
| 6,158,882 A * | 12/2000 | Bischoff, Jr. | F21V 23/005 362/249.02 |
| 6,371,637 B1 | 4/2002 | Atchinson et al. | |
| 6,461,008 B1 * | 10/2002 | Pederson | B60Q 1/2611 362/35 |
| 6,619,831 B2 * | 9/2003 | Kanesaka | B60Q 7/00 362/103 |
| 6,840,655 B2 | 1/2005 | Shen | |
| 6,866,398 B2 * | 3/2005 | Lin | F21S 4/26 362/244 |
| 7,033,036 B2 * | 4/2006 | Pederson | B60Q 1/2611 362/35 |
| 7,034,230 B2 | 4/2006 | Fan | |
| 7,202,607 B2 | 4/2007 | Kazar et al. | |
| 7,210,818 B2 * | 5/2007 | Luk | H05B 33/0857 361/749 |
| 7,425,088 B2 * | 9/2008 | Weitzel | B60Q 1/323 362/276 |
| 7,604,361 B2 | 10/2009 | Pohlert et al. | |
| 7,988,332 B2 * | 8/2011 | Lo | F21S 4/006 362/246 |
| 8,348,492 B2 * | 1/2013 | Mier-Langner | F21V 21/096 362/147 |
| 8,915,609 B1 * | 12/2014 | Shah | F21S 4/10 362/183 |
| 9,638,401 B2 * | 5/2017 | Li | F21V 21/005 |
| D788,955 S * | 6/2017 | Yu; Feng | D26/28 |
| 2004/0201984 A1 * | 10/2004 | Eaton | F21L 4/005 362/157 |
| 2005/0158687 A1 * | 7/2005 | Dahm | A61C 19/004 433/29 |
| 2006/0087851 A1 * | 4/2006 | Dubord | F21K 9/00 362/362 |
| 2006/0232962 A1 * | 10/2006 | Altman | B60Q 1/52 362/227 |
| 2006/0274525 A1 * | 12/2006 | Nielson | F21S 9/022 362/249.01 |
| 2007/0147028 A1 * | 6/2007 | Chan | A47G 33/06 362/123 |
| 2007/0156208 A1 * | 7/2007 | Havell | A61N 5/0616 607/88 |
| 2007/0263385 A1 * | 11/2007 | Fan | G09F 13/22 362/249.16 |
| 2008/0079012 A1 | 4/2008 | Grote et al. | |
| 2008/0080200 A1 * | 4/2008 | Robbins | B60Q 1/2696 362/487 |
| 2008/0316742 A1 * | 12/2008 | Zhou | H05B 33/0803 362/231 |
| 2009/0051517 A1 | 2/2009 | Suzuki | |
| 2009/0086478 A1 * | 4/2009 | Sanroma | A47F 3/001 362/234 |
| 2009/0251894 A1 | 10/2009 | Tsai | |
| 2009/0279298 A1 * | 11/2009 | Mier-Langner | F21V 21/096 362/235 |
| 2010/0008090 A1 * | 1/2010 | Li | F21V 17/007 362/249.03 |
| 2010/0271834 A1 * | 10/2010 | Muessli | F21V 21/35 362/398 |
| 2011/0013395 A1 * | 1/2011 | Melzner | F21S 2/005 362/240 |
| 2011/0050120 A1 | 3/2011 | Leung et al. | |
| 2011/0149570 A1 * | 6/2011 | Wenzlick | F21L 14/023 362/249.02 |
| 2011/0211357 A1 * | 9/2011 | Preuschl | H05K 3/0052 362/418 |
| 2011/0255276 A1 * | 10/2011 | Coward | F21V 14/02 362/217.02 |
| 2011/0286207 A1 * | 11/2011 | Chan | F21V 15/013 362/217.1 |
| 2011/0309746 A1 | 12/2011 | Eckel et al. | |
| 2012/0049739 A1 * | 3/2012 | Clough | F21L 4/00 315/113 |
| 2012/0068621 A1 * | 3/2012 | Ward | F21V 21/096 315/294 |
| 2012/0182755 A1 * | 7/2012 | Wildner | G09F 9/301 362/555 |
| 2012/0218744 A1 * | 8/2012 | Popper | F21V 14/025 362/184 |
| 2012/0242234 A1 | 9/2012 | Long et al. | |
| 2012/0327647 A1 * | 12/2012 | Husong | F21S 4/20 362/220 |
| 2013/0021811 A1 * | 1/2013 | Goldwater | B62J 6/00 362/473 |
| 2013/0044501 A1 * | 2/2013 | Rudisill | H05K 3/325 362/398 |
| 2013/0107514 A1 | 5/2013 | McNabb et al. | |
| 2013/0215604 A1 * | 8/2013 | Chu | A41D 13/01 362/184 |
| 2013/0294081 A1 * | 11/2013 | O'Connor | F21S 2/005 362/285 |
| 2013/0313983 A1 * | 11/2013 | Radermacher | H05B 33/0803 315/187 |
| 2013/0335996 A1 * | 12/2013 | Yao | F21V 21/06 362/581 |
| 2014/0085896 A1 * | 3/2014 | Li | F21V 17/007 362/249.04 |
| 2014/0204572 A1 * | 7/2014 | Spinelli | F21K 9/10 362/223 |
| 2014/0313725 A1 * | 10/2014 | Li | F21K 9/20 362/249.06 |
| 2014/0328054 A1 * | 11/2014 | Andersen | F21L 4/00 362/202 |
| 2014/0331532 A1 * | 11/2014 | Deppiesse | F21S 4/005 40/541 |
| 2014/0362574 A1 * | 12/2014 | Barrett | F21S 2/00 362/249.03 |
| 2015/0009651 A1 * | 1/2015 | Lee | F21K 9/17 362/95 |
| 2015/0049467 A1 * | 2/2015 | Thompson | B25B 23/18 362/120 |
| 2015/0251598 A1 * | 9/2015 | Andrews | B60Q 7/00 362/486 |
| 2015/0325949 A1 * | 11/2015 | Wei | H01F 7/0263 439/39 |
| 2015/0345759 A1 * | 12/2015 | Gazlay | F21V 21/08 362/190 |
| 2016/0018070 A1 * | 1/2016 | Van Deursen | F21V 21/096 362/191 |
| 2016/0223149 A1 * | 8/2016 | Gerpheide | F21L 4/00 |
| 2016/0245485 A1 * | 8/2016 | Nagel | F21V 23/04 |
| 2016/0290615 A1 * | 10/2016 | Hou | F21V 23/007 |
| 2017/0097128 A1 * | 4/2017 | Stafford | F21S 4/22 |
| 2017/0184283 A1 * | 6/2017 | Chien | F21V 21/005 |

OTHER PUBLICATIONS

Tweaking for ALI https://www.tweaking4all.com/hardware/arduino/arduino-ws2812-led/ Jan. 4, 2014, light strip shown with resistors.*
www.ledworldlighting.com/ledstripRGB.html (and similar pages on this website). LED World Lighting, LED RGB Strip Light—Color Changing Light—dated retrieved Dec. 19, 2011.
http://trumplighting.en.made-in-china.com/product/CoZQkjvGPNWs/China-SMD-5050-PU-Waterproof-Christmas-Flexible-LED-Strip-Light.html (and similar pages on this website), Shenzhen Trump Lighting Technology Co., Ltd., SMD 5050 PU Waterproof Christmas Christmas Flexible LED Strip Light—date retrieved Dec. 19, 2011.
http://www.cryon.com/c-8-strip-linear-lights.aspx (and similar pages on this website), CYRON Lighting Strip-Linear lighting products—date retrieved Mar. 26, 2013.

(56) References Cited

OTHER PUBLICATIONS http://www.grote.com/LightForm/Product.html (and similar pages on this website), LightForm Flexible LED Strips lighting products—date retrieved Mar. 26, 2013.
http://fwww.alpena.ca/category.aspx?catid=31 {and similar pages on this website), Alpena Flex LEDZ—date retrieved Mar. 26, 2013.
http://fwww.streetfxseries.com (and similar pages on this website), Home Page, StreetFX—date retrieved Mar. 26, 2013.
http://fwww.kuryakyn.com/Goldwing/Lighting {and similar pages on this website), Kuryakyn Lighting—date retrieved Mar. 26, 2013.
http://fwww.customdynamics.com/courtesy_lights.htm {and similar pages on this website), Custom Dynamics® LEDS, Motorcycle LED Accent Lights Kits—date retrieved Mar. 26, 2013.
http://fwww.boogey.com (and similar pages on this website), Boogey Lights®, Boogey Lights Motorcycle LED Lights—date retrieved Mar. 26, 2013.
http://fwww.chromeglow.com/store.asp?pid=6746&catid=19650 (and similar pages on this website), Chrom Glow LED Accent Lighting, Motorcycle LED Lights—date retrieved Mar. 26, 2013.
http://fwww.ledaccentlights.net/store/index.php?main_page=index&cPath=45 {and similar pages on this website), LED Accent Lights, Multi-Color Motorcycle Kits—date retrieved Mar. 26, 2013.
http://fwww.radiantz.com/index1.htm?c34.html&1 (and similar pages on this website), Radiantz LED Lighting—date retrieved Mar. 27, 2013.

* cited by examiner

MAGNETIC LIGHT EMITTING DIODE (LED) LIGHTING SYSTEM

CROSS-REFERENCE TO RELATED APPLICATIONS

This application claims priority to U.S. Provisional Application No. 62/138,766, which was filed on Mar. 26, 2015, the entirety of which is hereby incorporated by reference.

BACKGROUND

Lighting systems incorporating light-emitting diodes ("LEDs") are increasingly popular. LEDs present certain advantages over conventional incandescent and fluorescent lights, including compactness, longevity, and durability. An LED emits light when the p-n junction comprising the diode is forward-biased, enabling a current to flow across the junction and emit light in the process. LEDs are available in a wide variety of colors, including red, orange, yellow, green, blue, and white. LEDs are being incorporated into products at an increasing rate. For example, some manufacturers make lightbulbs for conventional fixtures using LEDs. LEDs made from polymers (e.g., organic LEDs) are being incorporated into displays. LEDs come in many shapes and sizes, from small, low-output LEDS (such as those used as indicator lights) to larger, high-output LEDs (such as those used for illumination).

Some LEDs (e.g., high output LEDs) may discharge a large amount of light but generate relatively more heat during operation. Such LEDs require an element for discharging generated heat, such as a heat sink, to prevent thermal destruction of or damage to the LED. Incorporating an extra element, such as an external heat sink, however, can add to the weight and/or size of the LED system. In some applications, this added weight and/or size can be undesirable.

BRIEF SUMMARY

The system of the present disclosure provides a mountable LED lighting apparatus that uses LEDs (e.g., relatively high-output LEDs) sufficient for illumination. The present disclosure provides such a lighting apparatus that allows a single element, such as a magnet, to provide mounting and heat-sink functions. Such a lighting apparatus may allow the use of one or more relatively high-output LEDs while maintaining effective heat dissipation and a desirable size and weight.

The mountable LED lighting apparatus described in the present disclosure may allow high-output LEDs to be used in a variety of applications. For example, the lighting apparatus may be mounted on an industrial machine, such as a mill or lathe, to provide a bright working environment in small working spaces, obviating the need for separate lights or large lights that may interfere with the machinist. Alternatively, the lighting apparatus may be mounted on various parts of an automobile, such as the wheel wells, a truck bed, or the underside of the chassis, to provide bright, LED-generated light effects on or around the automobile. In each of these exemplary applications, a small form factor is desirable, so a lighting apparatus that combines the heat-sink and mounting functions into a single element, such as a magnet, is desirable.

BRIEF DESCRIPTION OF THE DRAWINGS

The foregoing and other features of the present disclosure will become more fully apparent from the following description and appended potential points of novelty, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
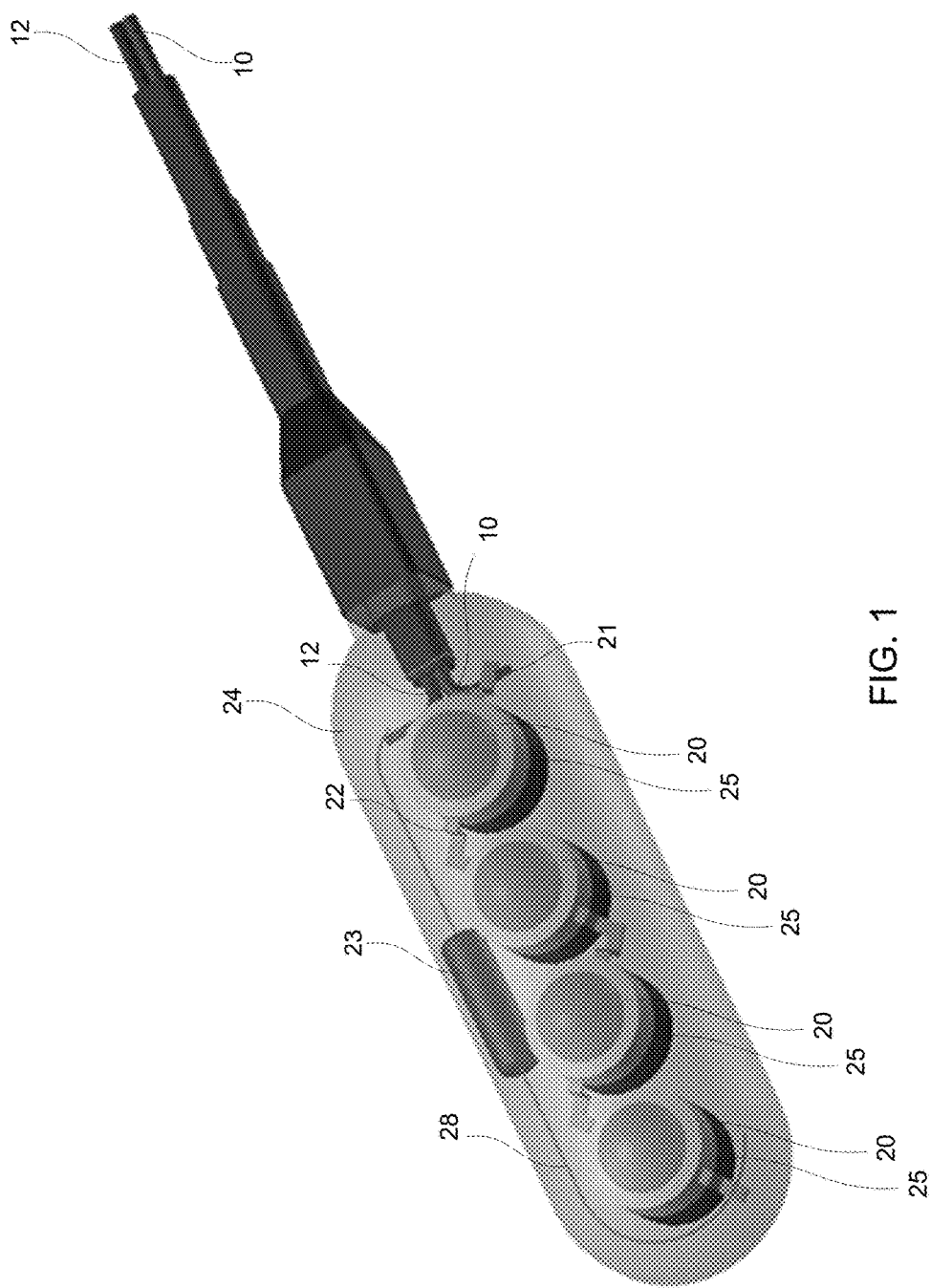
FIG. 1 is a perspective view of an example LED system.
Figure 2:
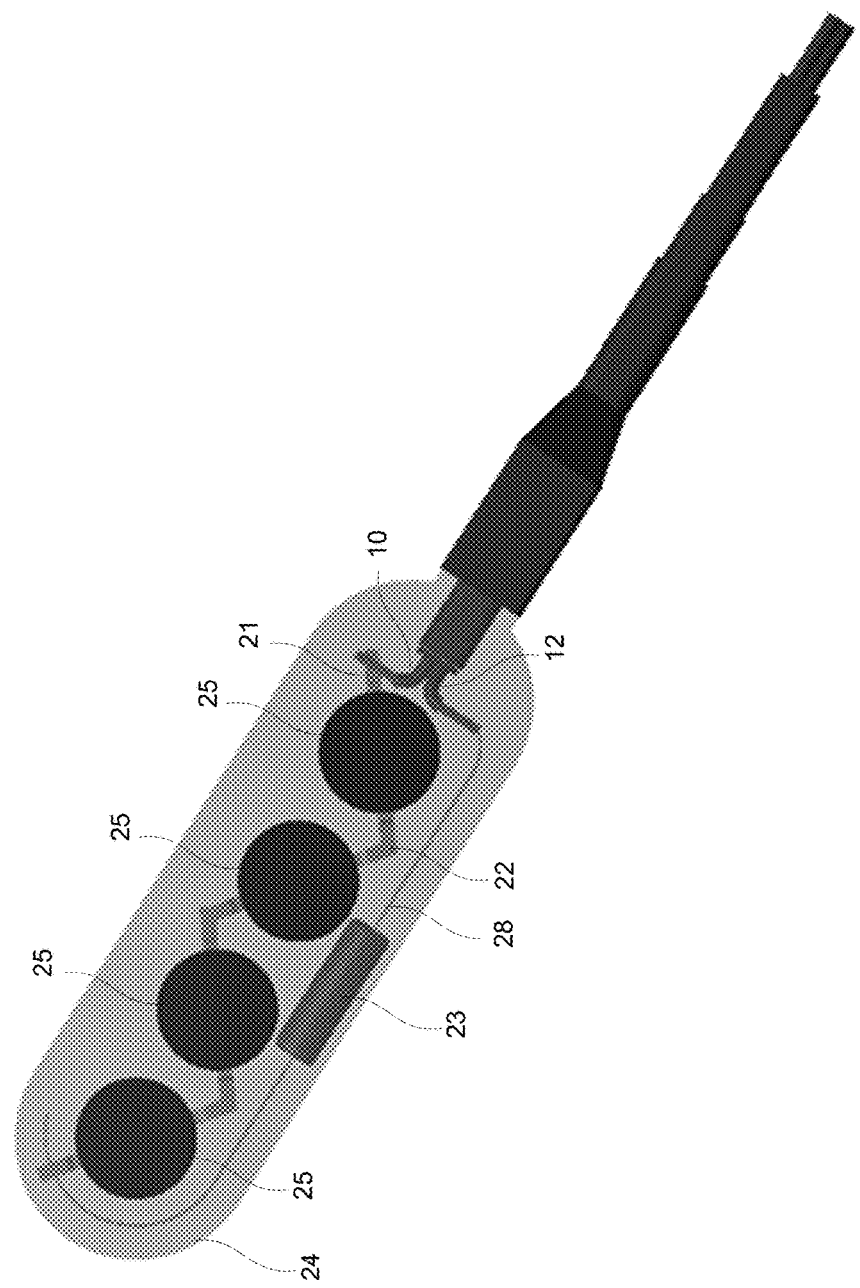
FIG. 2 is a bottom view of an example LED system.
Figure 3:
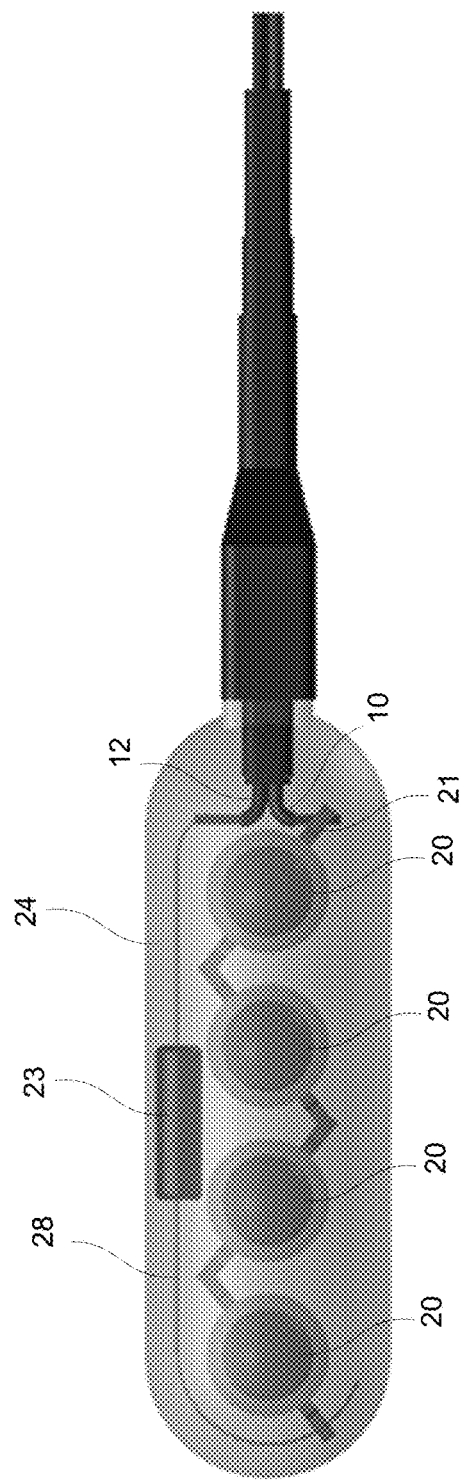
FIG. 3 is a top view of an example LED system.
Figure 4:
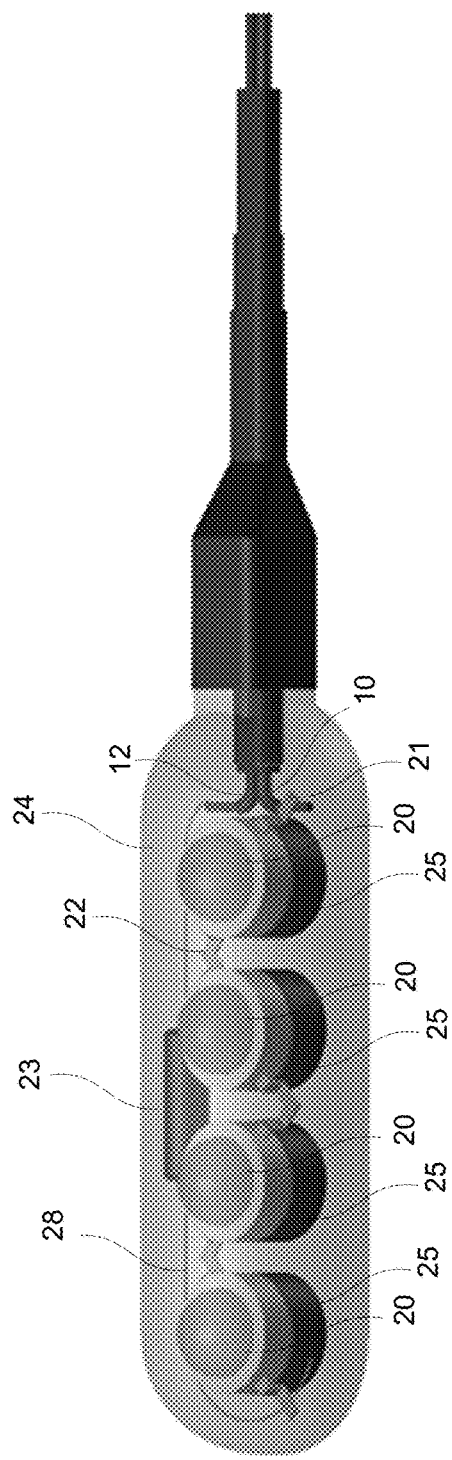
FIG. 4 is an alternate perspective view of an example LED system.
Figure 5:
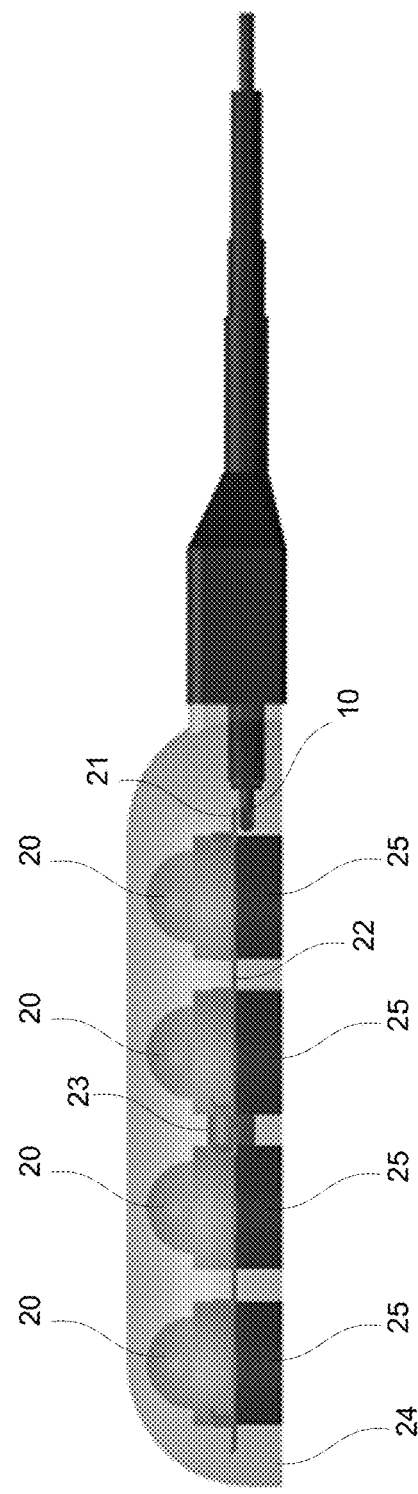
FIG. 5 is a side view of an example LED system.
Figure 6:
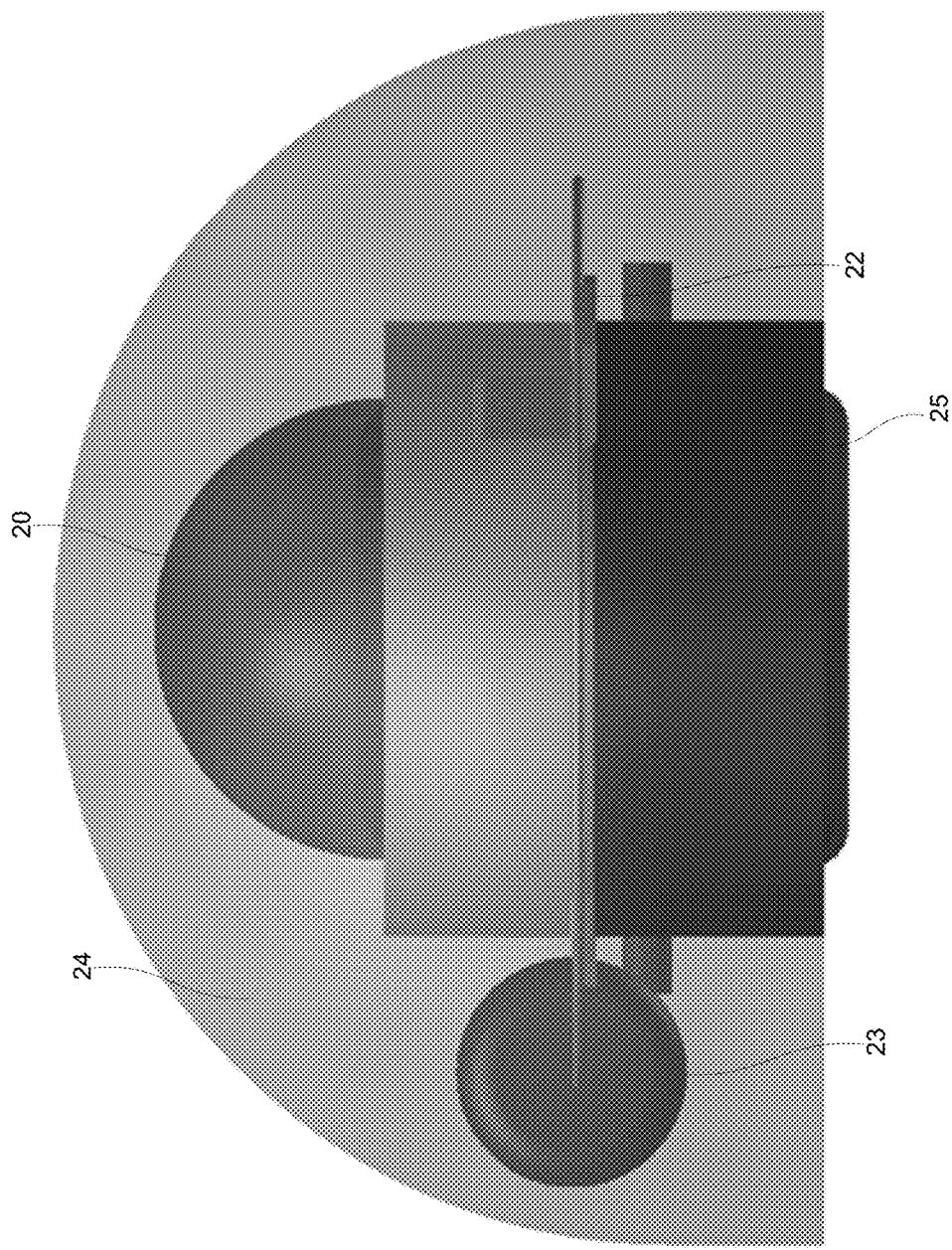
FIG. 6 is an end view of an example LED system.
Figure 7:
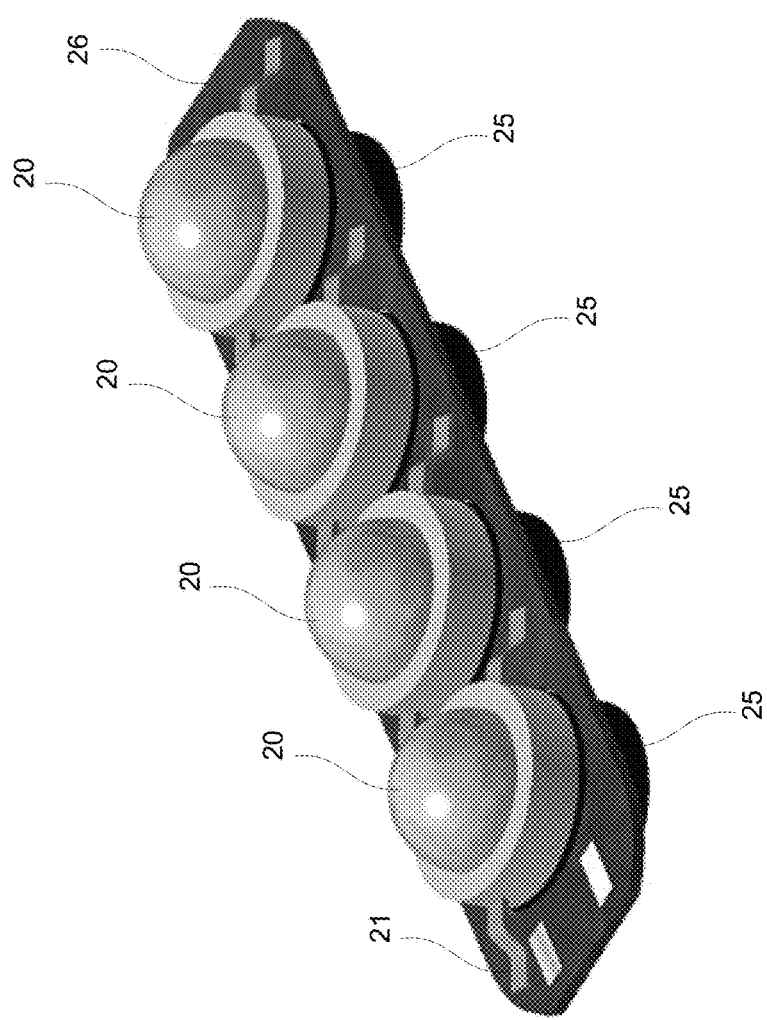
FIG. 7 is a perspective view of another example LED system.

In the following detailed description, reference is made to the accompanying drawings, which form a part hereof. In the drawings, similar symbols typically identify similar components, unless context dictates otherwise. The illustrative embodiments described in the detailed description, drawings, and potential points of novelty are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to methods, systems, devices and/or apparatus related to light emitting diode (LED) lighting systems for various applications. Specifically, some of the disclosed methods, systems, devices and/or apparatus relate to magnetic LED lighting systems for motorcycles, automobiles and commercial vehicles, flashing indicator lights for law enforcement and emergency vehicles, and/or indicator lights for the automotive industry including marker lights, turn signals, stop, back-up and tail lights. In some examples, the LED lighting system of the present disclosure may be used to provide aesthetic lighting for an automobile (e.g., underbody lighting, side body lighting). In some examples, the LED lighting system may provide off-road lights if mounted in a wheel well, or may illuminate a truck bed if mounted in or around a truck bed. In some examples, the magnetic lighting systems may be used in industrial environments, providing light for lathes or milling machines, for example.

With reference to FIGS. 1-6, an LED lighting apparatus may include positive wire 10, negative wire 12, LEDs 20, positive terminal 21, negative terminal 22, resistor 23, and resin/polymer encasing 24, and/or magnets 25. As shown, the LEDs and resistor may be coupled to each other in series via a conductive element 28 (e.g. wire, conductor).

In some examples, the LED lighting system may include conductive elements 10, 12 (e.g., wires, wire leads, conductors) operatively coupling a power source to an LED unit. The wires may include a positive wire 10 and a negative wire 12, and may have a protective insulation covering(s). The LED unit may include resistor(s) 23, one or more LEDs 20, and one or more magnets 25 (e.g., rare earth magnets, such as neodymium magnets).

A resistor 23 may include a positive terminal and a negative terminal. The resistor(s) may be coupled to the LEDs 20 in series, for example. In an LED lighting system containing a plurality of LEDs 20, the LEDs 20 and the resistor(s) 23 may be coupled in series, as shown in FIGS. 1-6.

The LEDs 20 may include a plurality of LEDs 20 (e.g., 2, 3, 4, 6, 8, or 10 LEDs) coupled in series, each including a positive terminal 21 and a negative terminal 22. Wires 10, 12 may be coupled to a positive terminal 21 of the first LED 20 (of a plurality of LEDs 20) and the negative terminal of the resistor 23. In some examples, the LEDs 20 may include surface mount (SMT) LEDs or 2-surface mount device (2SMD) gullwing LEDs, for example. In other examples, other known LEDs may be used.

The magnet(s) 25 may be directly or indirectly coupled to the LED unit or LEDs 20. In some examples, as in the example lighting apparatus in FIGS. 1-6, the magnets 25 may be glued, soldered, or otherwise affixed to the LEDs 20. In some examples, each magnet 25 may be affixed to an LED 20; for example, if there are four LEDs 20 in the system, there may be four magnets 25, one magnet 25 per LED 20. In some examples, the magnets 25 are adhered to the LEDs 20 with one or more epoxy resins. The epoxy resins may be curable, for example, one or more thermosetting epoxy resins, heat-curable epoxy resins, UV-curable epoxy resins, and/or hardened epoxy resins. In some examples, each LED 20 has a neodymium magnet 25 adhered to the LED via a heat-cured epoxy adhesive.

Figure 8:
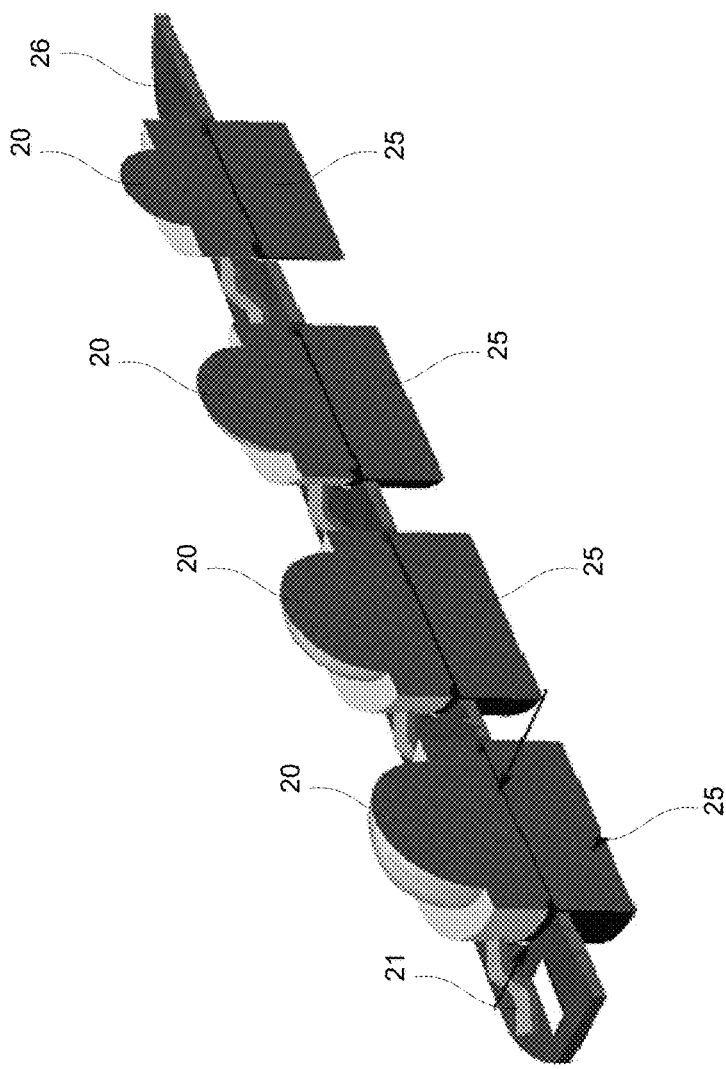
FIG. 8 is a cross-sectional, perspective view of another example LED system.
Figure 9:
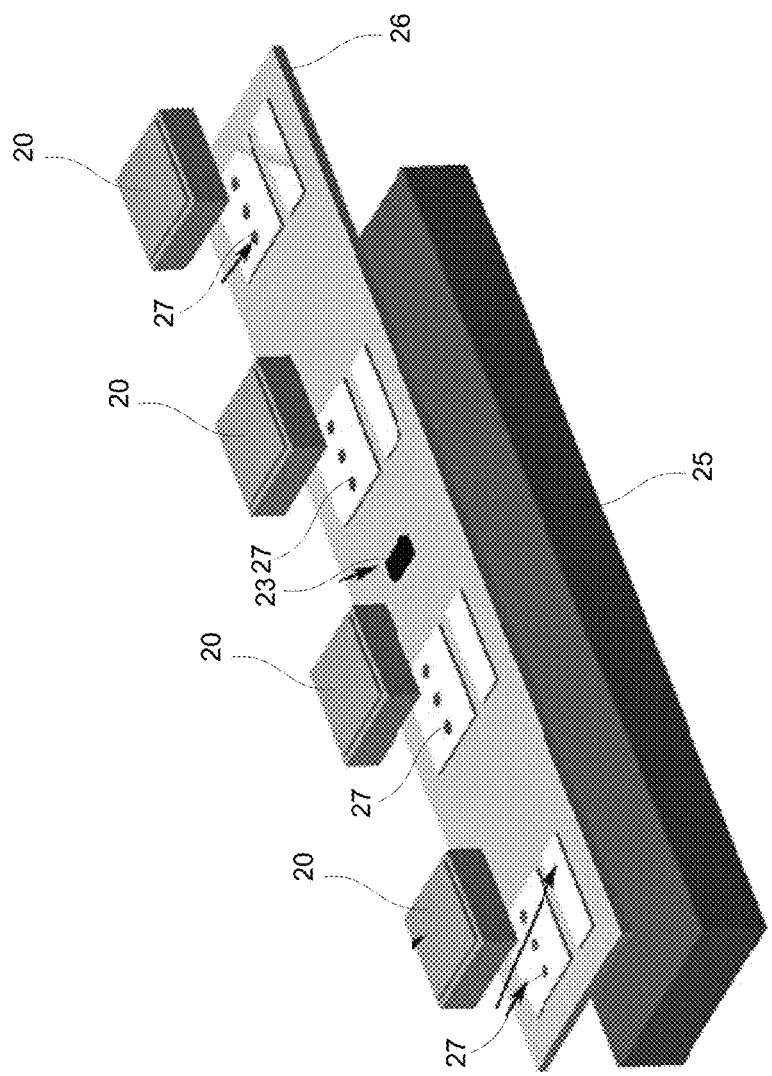
FIG. 9 is an exploded perspective view of yet another example LED system.
Figure 10:
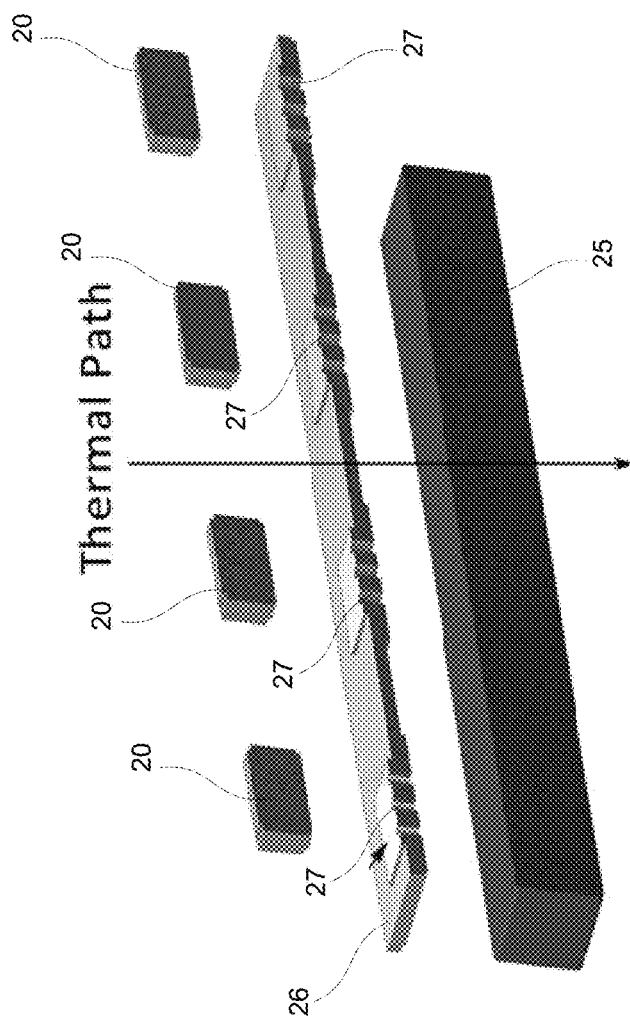
FIG. 10 is an exploded, cross-sectional, perspective view of yet another example LED system.
Figure 11:
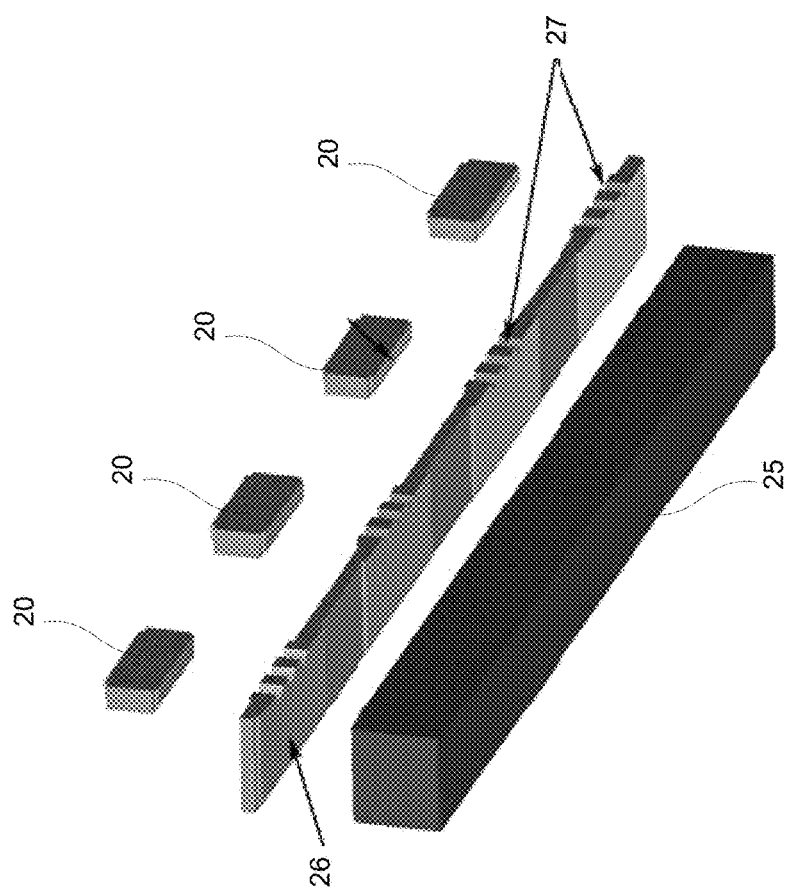
FIG. 11 is another exploded, cross-sectional perspective view of yet another example LED system; each arranged in accordance with at least an example of the present disclosure.

In some examples, such as illustrated in FIGS. 7-11, the LEDs 20 and the magnet(s) 25 may be affixed to a mounting element 26, such as a circuit board or printed circuit board. In some examples, such as the examples illustrated in FIGS. 7-11, mounting element 26 may be present, but in other examples, such as the examples illustrated in FIGS. 1-6, a mounting element may not be present. Where a mounting element 26 is present, mounting element 26 may have one or more holes cut therethrough, enabling the LEDs 20 to contact the magnet(s) 25, as seen in FIG. 8. In some examples, as shown in FIG. 9-11, LEDs 20 may be affixed to a first side of mounting element 26, and one or more magnets 25 are affixed to a second side of mounting element 26 opposite the LEDs 20.

Mounting element 26 may include thermal vias or channels 27 therethrough. Thermal vias 27 enable a connection (e.g., thermal connection) to be formed from the LEDs 20 to the magnet(s) 25. In some examples, thermal vias 27 provide a thermal coupling between LEDs 20 and magnet(s) 25. In this manner, the thermal vias 27 may allow heat generated by the LEDs 20 to be transferred away from the LEDs to the magnet(s) 25. The magnet(s) 25 may dissipate the heat from the LEDs 20. The magnet(s) 25 may act as a heat sink, while simultaneously serving a role of coupling the lighting apparatus to a surface such as a vehicle surface. It will be readily apparent that multiple magnets 25 in FIGS. 7-8 may be used, while some examples may use a single magnet 25 such as that shown in FIG. 9-11, depending on the mounting and size specifications of a user.

Each magnet 25 may have a plurality of functions. The magnets 25 may provide for easy installation, moving, and removal of the lighting system of the present disclosure. Second, each magnet 25 may act as a heat sink for its respective attached LED 20 (or the attached LEDs 20 in the case of only one larger magnet 25), thereby preventing or reducing the likelihood of overheating and thermal destruction of the LEDs 20.

The connection area of the wires 10, 12, the resistor(s) 23, the LEDs 20, and the magnets 25 may be cast in a rigid, semi-rigid, or flexible resin 24.

The wires 10, 12 may be coupled to the power source such that the power source may provide electricity through the wires 10, 12 and to the LED unit and the LEDs 20. In some examples, a switch may be coupled to the wires 10, 12 such that electricity may be selectively provided to the LEDs 20 depending on the status of switch (e.g., on, off, high, low).

In some examples, the lighting system may comprise a plurality of LEDs 20 connected in series with a resistor 23. In an example embodiment, the lighting system includes four LEDs 20 connected in series with a resistor 23. In some examples, the lighting system includes six LEDs 20 connected in series with a resistor 23. In yet another example, the lighting system includes eight LEDs 20 connected in series with a resistor 23.

In some examples, the lighting system of the present disclosure comprises a wire lead, which includes a positive wire 10 and a negative wire 12. The negative wire 12 may connect to the negative terminal of the resistor 23, and the positive wire 10 may connect to the positive terminal 21 of the first LED 20. The LEDs 20 may be arranged in series, with the positive terminal 21 of the second LED 20 connecting to the negative terminal 22 of the first LED 20, and so on. The positive terminal of the resistor 23 connects to the negative terminal 22 of the last LED 20. The wire lead may include one or more layers of protective insulation.

In some examples, the lighting system in accordance with the present disclosure may be used in automotive applications. The supply voltage for a lighting system in an automotive may generally be a 12 V DC supply voltage. Any color or combination of colors may be used in such a lighting system. As a non-limiting example, a series of six LEDs can be amber or red colored and used for auxiliary brake or turn-signal lights. Alternately, a series of four, six, or eight LEDs may be used in any available color for accent lighting, ground-effect lighting, truck rail-bed lighting, off-road night-condition lighting, and the like. Furthermore, the present disclosure is not limited to LEDs in series of four, six, and eight; those having skill in the art will realize that many different numbers of lights may be used as the application dictates.

In some examples, the lighting system in accordance with the present disclosure may be used in one or more industrial applications. The supply voltage for a lighting system in an automotive may generally be a 24 V DC supply voltage. Any color or combination of colors may be used in such a lighting system. As a non-limiting example, a series of eight LEDs can be used for high-output, temporary lighting. Alternately, series of four, six, or eight LEDs may be used in any available color similar purposes. Furthermore, the present disclosure is not limited to LEDs in series of four, six, and eight; those having skill in the art will realize that many different numbers of lights may be used as the application dictates. Exemplary industrial uses include high-output, temporary lighting for machines such as lathes, milling machines, drills, boring machines, presses, grinders, saws, shears, buffers, and like industrial or metalworking machines.

In the case of commercial vehicle use (e.g., commercial semi-tractor trailer trucks, box trucks, delivery trucks, tow trucks, repair trucks), some example lighting systems may be desirable for use in marker lights, turn signal, stop light, tail light, and reverse lights. Because of the durability of the light strip and the waterproof construction, some example lighting systems may be installed in commercial service applications.

For vehicle applications (e.g., motorcycles, automobiles), some examples disclosed herein may be installed on a vehicle as an aftermarket lighting system. Some examples may include lighting systems that are integrated into a vehicle's ignition system, brake system and directional turn signal systems, among others.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following potential points of novelty.

What is claimed is:

1. A lighting apparatus, comprising:
    a mounting element comprising a first side and a second side;
    one or more light-emitting diodes affixed to the first side of the mounting element;
    a resistor coupled to the one or more light-emitting diodes and affixed to the first side of the mounting element;
    a magnet affixed to the second side of the mounting element, wherein at least part of the magnet is positioned opposite the one or more light-emitting diodes; and
    a hole through the mounting element, wherein the one or more light-emitting diodes is affixed to the first side of the mounting element over the hole, wherein the magnet is affixed to the second side of the mounting element over the hole, and wherein at least part of the one or more light-emitting diodes physically contacts at least part of the magnet.

2. The lighting apparatus of claim 1, further comprising a plurality of light-emitting diodes coupled in a series circuit configuration, wherein the resistor is also coupled in the series circuit configuration to the plurality of light-emitting diodes.

3. The lighting apparatus of claim 2, further comprising a plurality of magnets, wherein at least one magnet of a plurality of magnets is positioned opposite each of the plurality of light-emitting diodes.

4. The lighting apparatus of claim 3, further comprising a plurality of holes through the mounting element, wherein the each of the plurality of light-emitting diodes is affixed to the first side of the mounting element over a hole, wherein each of the plurality of magnets is affixed to the second side of the mounting element over a hole, and wherein at least part of each of the plurality of light-emitting diodes contacts at least part of a magnet.

5. The lighting apparatus of claim 1, wherein the magnet is a neodymium magnet.

6. The lighting apparatus of claim 1, further comprising a polymer encasing the mounting element, the one or more light-emitting diodes, and the resistor.

7. The lighting apparatus of claim 1, further comprising a polymer encasing the mounting element, the one or more light-emitting diodes, the resistor, and the magnet.

8. The lighting apparatus of claim 6, wherein the polymer comprises a thermosetting resin.

9. A lighting apparatus, comprising:
    a printed circuit board comprising a first side and a second side;
    one or more light-emitting diodes affixed to the first side of the printed circuit board;
    a resistor coupled to the one or more light-emitting diodes and affixed to the first side of the printed circuit board;
    a magnet affixed to the second side of the printed circuit board, wherein at least part of the magnet is positioned opposite the one or more light-emitting diodes; and
    one or more thermal vias through the printed circuit board, wherein a first side of the one or more thermal vias is thermally coupled to the one or more light-emitting diodes, and a second side of the one or more thermal vias is thermally coupled to the magnet.

10. The lighting apparatus of claim 9, further comprising a plurality of light-emitting diodes coupled in a series circuit configuration, wherein the resistor is also coupled in the series circuit configuration to the plurality of light-emitting diodes.

11. The lighting apparatus of claim 10, further comprising a plurality of thermal vias through the printed circuit board, wherein each of the plurality of light-emitting diodes is thermally connected to a first side of at least one of the thermal vias, and wherein each magnet positioned opposite a light-emitting diode is thermally connected to a second side of at least one of the thermal vias.

12. A lighting apparatus, comprising:
    a light-emitting diode;
    a resistor electrically coupled in a series circuit configuration to the light-emitting diode; and
    a magnet directly contacting the light-emitting diode.

13. The lighting apparatus of claim 12, further comprising a plurality of light-emitting diodes, wherein the magnet is affixed to at least part of each light-emitting diode.

14. The lighting apparatus of claim 13, further comprising a plurality of magnets, wherein at least one magnet is affixed to each light-emitting diode.

15. The lighting apparatus of claim 14, further comprising a polymer encasing the plurality of light-emitting diodes, the resistor, and at least part of each magnet.

16. The lighting apparatus of claim 15, wherein the polymer comprises a thermosetting resin.

17. The lighting apparatus of claim 16, wherein the magnet is a neodymium magnet.

18. The lighting apparatus of claim 12, wherein the magnet is a neodymium magnet.

19. The lighting apparatus of claim 14, wherein each magnet is a neodymium magnet.

* * * * *